United States Patent
Zurko et al.

(10) Patent No.: US 7,853,471 B2
(45) Date of Patent: Dec. 14, 2010

(54) INSTANCE MESSAGING AUTO-SCHEDULING

(75) Inventors: Mary Ellen Zurko, Groton, MA (US); Mary E. Raven, Merrimack, NH (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 10/334,535

(22) Filed: Dec. 31, 2002

(65) Prior Publication Data

US 2004/0128181 A1   Jul. 1, 2004

(51) Int. Cl.
G06F 9/46 (2006.01)
(52) U.S. Cl. ............................ 705/9; 705/8
(58) Field of Classification Search .......... 705/7, 705/8, 9; 707/3
See application file for complete search history.

(56) References Cited

U.S. PATENT DOCUMENTS

| | | | |
|---|---|---|---|
| 6,195,651 B1 * | 2/2001 | Handel et al. ............... | 707/2 |
| 6,363,352 B1 * | 3/2002 | Dailey et al. ............... | 705/9 |
| 6,636,888 B1 * | 10/2003 | Bookspan et al. ........... | 709/203 |
| 7,082,430 B1 * | 7/2006 | Danielsen et al. ........... | 707/10 |
| 7,124,164 B1 * | 10/2006 | Chemtob ..................... | 709/204 |
| 7,454,459 B1 * | 11/2008 | Kapoor et al. ............... | 709/203 |
| 2002/0076025 A1 * | 6/2002 | Liversidge et al. ......... | 379/202.01 |
| 2002/0122391 A1 * | 9/2002 | Shalit ......................... | 370/260 |
| 2002/0138585 A1 | 9/2002 | Sen | |
| 2002/0144136 A1 | 10/2002 | Stornetta, Jr. et al. | |
| 2002/0198909 A1 * | 12/2002 | Huynh et al. ............... | 707/513 |
| 2003/0028524 A1 * | 2/2003 | Keskar et al. ............... | 707/3 |
| 2004/0095378 A1 * | 5/2004 | Vigue et al. ................ | 345/723 |
| 2004/0098447 A1 * | 5/2004 | Verbeke et al. ............. | 709/201 |

FOREIGN PATENT DOCUMENTS

WO    WO 01/98936 A2    12/2001

OTHER PUBLICATIONS

Hollan et al, "Asynchronous Negotiated Access", Department of Cognitive Science, University of California, San Diego, Jun. 8, 2000.*
Bazinette et al, "An Intelligent Notification System", IBM Research Division, Thomas J. Watson Research Center, RC 22089 (99042) Jun. 12, 2001.*
Ramaswamy et al, "A Pervasive Conversational Interface for Information Interaction", Sixth European Conference on Speech Communication and Technology (EuroSpeech '99), Budapest, Hungary, Sep. 5-9, 1999.*

* cited by examiner

Primary Examiner—Lynda C Jasmin
Assistant Examiner—Thomas Mansfield
(74) Attorney, Agent, or Firm—Scully, Scott, Murphy & Presser, P.C.; Daniel McLoughlin, Esq.

(57) ABSTRACT

A method and system for scheduling a meeting. The method comprises the steps of receiving a request from a participant in an instant message session to schedule a meeting; and running a natural language processing tool to determine meeting participants and available times, from a record of the message session. A calendaring and scheduling application is run to accept the meeting participants and available times, consult calendars of the meeting participants, and schedule the meeting. A notification is sent to the participants in the instant message session of the meeting schedule, and the meeting schedule is added to the calendars of the meeting participants.

20 Claims, 2 Drawing Sheets

INSTANCE MESSAGING AUTO-SCHEDULING

BACKGROUND OF THE INVENTION

1. Field of the Invention

This invention generally relates to methods and systems for harvesting information from one computer process and using that information in another computer process. More specifically, the invention relates to methods and systems of this type that are particularly well suited for harvesting and using information for scheduling meetings.

2. Background Art

Information available in one collaboration context or application can greatly enhance the value of another collaboration context or application. Yet the lack of integration across those applications makes users do something that is redundant to them to get the effect they want. For example, with instant messaging (IM) chat or electronic meetings (e-meetings), two or more people may be conversing on a topic, and decide to get together. They will talk about when they are free, were they will be, and so on. Then someone has to go to another application, the calendaring application, and input all that information in a more structured fashion, even though it is all in the computer, just in another context and format.

SUMMARY OF THE INVENTION

An object of the invention is to improve methods and systems for scheduling meetings.

Another object of the invention is to. allow meeting scheduling directly from a chat or e-meeting, using information gleaned from the chat or e-meeting.

These and other objectives are attained with a method and system for scheduling a meeting. The method comprises the steps of receiving a request from a participant in an instant message session to schedule a meeting; and running a natural language processing tool to determine meeting participants and available times, from a record of the instant message session. A calendaring and scheduling application is run to accept the meeting participants and available times, consult calendars of the meeting participants, and schedule the meeting. A notification is sent to the participants in the instant message session of the meeting schedule, and the meeting schedule is added to the calendars of the meeting participants.

In a preferred embodiment of the invention, a process, such as IM/e-meeting (in applications like Lotus SameTime) is integrated with a calendaring and scheduling (C&S, in applications like Lotus Notes/Domino). This can be additionally augmented with some natural language processing for more sophisticated translation of the unformatted IM chat. Also, the natural language processing tool may be run during the instant message session to determine meeting participants and available times from the record of the message session, and the calendaring and scheduling application may be run during the instant message session to accept the meeting participants and available times, consult calendars of the meeting participants, and schedule the meeting. Likewise, the above-mentioned notification of the meeting schedule may be sent to the participant in the instant message session during that session.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
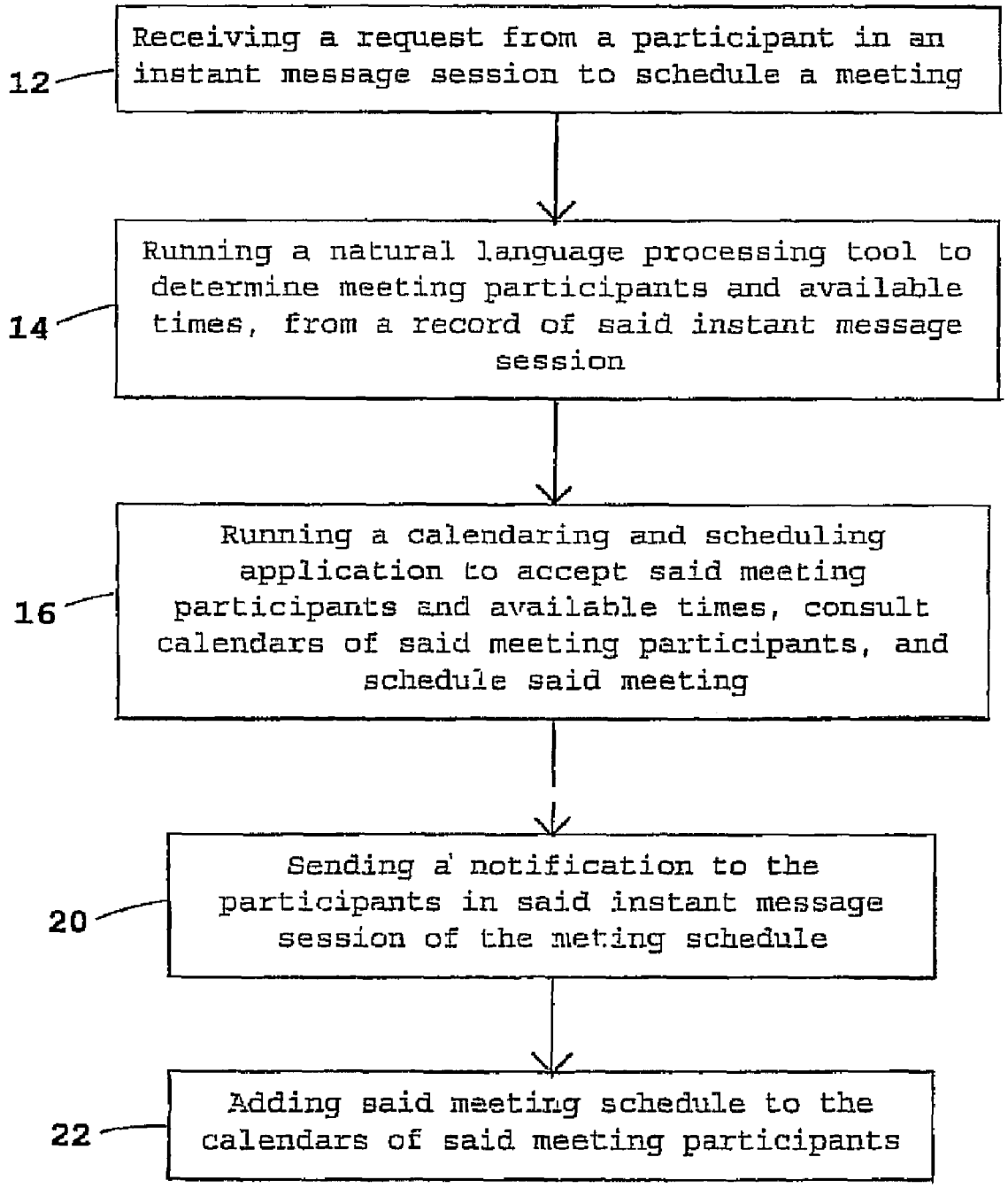
FIG. 1 is a flow chart showing a preferred procedure for implementing this invention.

The present invention generally provides a method and system for scheduling meetings. With reference to FIG. 1, a preferred method includes the steps, represented at 12 and 14, of receiving a request from a participant in an instant message session to schedule a meeting; and running a natural language processing tool to determine meeting participants and available times, from a record of the instant message session. As represented by step 16, a calendaring and scheduling application is run during the instant message session to accept the meeting participants and available times, consult calendars of the meeting participants, and schedule the meeting. At step 20, a notification is sent to the participants in the instant message session of the meeting schedule, and at step 22, the meeting schedule is added to the calendars of the meeting participants.

Figure 2:
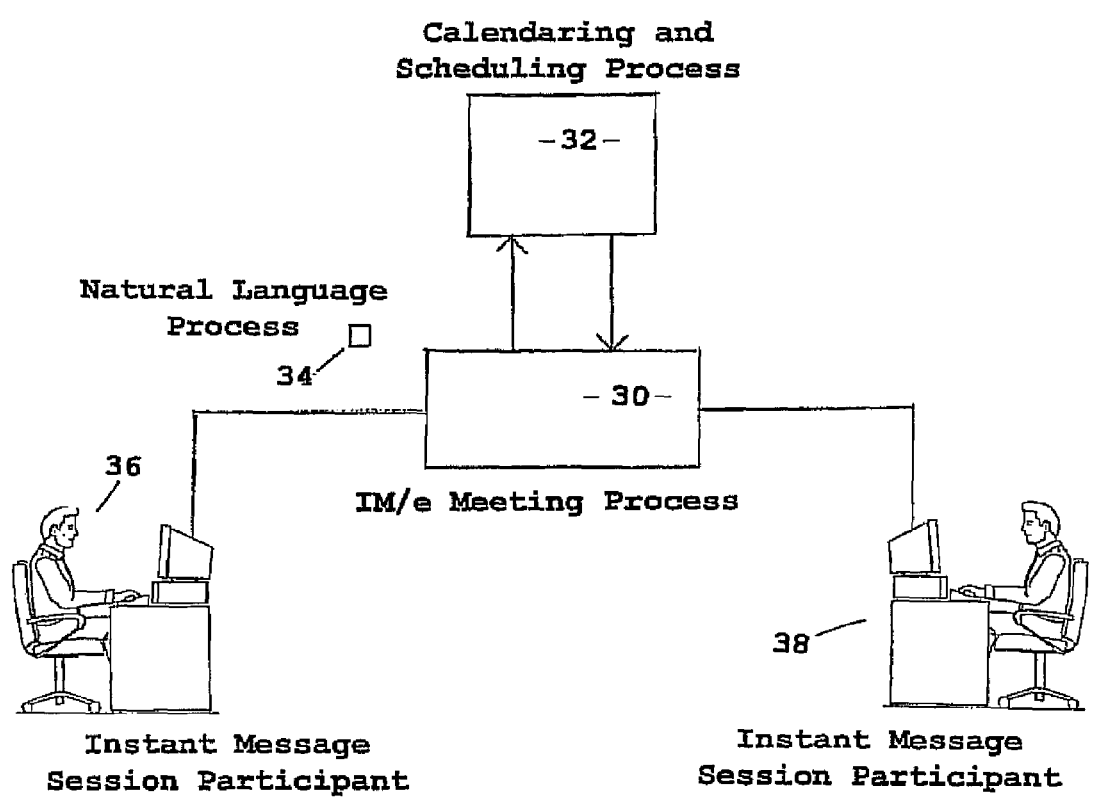
FIG. 2 diagrammatically illustrates operation of this invention.

In a preferred embodiment of the invention, and with reference to FIGS. 1 and 2, a process 30, such as IM/e-meeting (in applications like Lotus SameTime) is integrated with a calendaring and scheduling process 32 (C&S, in applications like Lotus Notes/Domino). This can be additionally augmented with some natural language processing, represented at 34, for more sophisticated translation of the unformatted IM chat. Also, the natural language processing tool may be run during the instant message session to determine meeting participants and available times from the record of the message session, and the calendaring and scheduling application may be run during the instant message session to accept the meeting participants and available times, consult calendars of the meeting participants, and schedule the meeting. Likewise, the above-mentioned notification of the meeting schedule may be sent to the participant in the instant message session during that session.

More specifically, in this preferred implementation, the flow is from the IM application 30 to the C&S application 32. The IM application has a command or button that says, for instance, "Schedule This." When this command or button is pressed, the IM application processes the current chat/e-meeting session data, looking for all information that would be pertinent to starting to fill in a meeting invitation in the C&S application.

The process starts by initializing the meeting invitees to the current IM participants 36 and 38, and the process might also include any participant in any part of the current IM session. This process could include anyone else mentioned, by going to a name resolution infrastructure (LDAP directory, blue pages, team central) of both the IM and C&S applications, and filling those in. The name resolution infrastructure may include information, like organizational relationships and titles, to resolve into names ambiguous titles and relationships like "my boss" or "the local head of HR."

The process then determines when the meeting should be. Preferably, it resolves simple phrases like "Tomorrow" and includes the notion of near negatives (such as, "I can't make it tomorrow, how about the day after?"). The process also preferably understands about times of day ("Monday afternoon"), and even in relation to the time zone of the particular speaker. If the C&S application can do freetime lookup, it can map the range of dates and times mentioned positively and negatively to participant freetime, and propose one or more times for the meeting. The algorithm can also be extended to places, such as "my office," "Mary Ellen's office," "the Bermuda conference room," and "the cafeteria."

Also, it should be noted that user interaction may (or may not) be required to finish filling out the meeting invitation. For example, the user may optionally input more information such as more meeting invitees, choose a location if none was discussed, input more agenda information or provide any additional suitable or appropriate information.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer implemented method of scheduling a meeting, using information obtained from an instant message session, the method comprising the steps of:
    a server computer system coupled to a database and in communication with a client system having a plurality of users, receiving a request from a participant in an instant message session to schedule a meeting, wherein an instant messaging application is used to run the instant message session;
    the server computer system running a natural language processing tool during the instant message session to determine meeting participants and available times, from a record of unformatted chat during said instant message session;
    running a calendaring and scheduling application during the instant message session to accept said meeting participants and available times, consult calendars of said meeting participants, and schedule said meeting;
    sending a notification during the instant message session to the participants in said instant message session of the meeting schedule;
    adding said meeting schedule to the calendars of said meeting participants;
    said instant messaging application processing data from the instant message session to fill in a meeting invitation in the calendaring and scheduling application, including the steps of
    initializing the meeting invitees to current participants in the instant message session,
    adding as additional invitees to the meeting any other participants in any part of the instant message session, and
    further adding as invitees to the meeting anyone else mentioned in the instant message session; and wherein
    the step of running the calendaring and scheduling application includes the step of using the calendaring and scheduling application to map a range of dates and times mentioned positively and negatively in the instant message session to participant free time to propose automatically one or more times for the meeting, and to resolve phrases including a reference to a time and a negative word near said reference.

2. A method according to claim 1, wherein the step of running the natural language processing tool includes the step of identifying at least some of the participants in the instant message session as meeting participants.

3. A method according to claim 2, wherein the step of running the natural language processing tool includes the step of identifying all of the participants in the instant message session as meeting participants.

4. A method according to claim 1, wherein the step of running the natural language processing tool includes the step of identifying as meeting participants at least some of the people mentioned in the message session.

5. A method according to claim 1, wherein in the instant message session at least some people are referred to by relationships or titles, and the step of running the natural language processing tool includes the step of identifying as meeting participants at least some of the people referred to in the instant message session by relationship or title.

6. A method according to claim 5, further comprising the steps of:
    providing a database identifying names for a given set of relationships and titles; and wherein
    the step of identifying as meeting participants includes the steps of
    i) identifying at least some of said set of relationships and titles mentioned in the instant message session, and
    ii) for each of said mentioned relationships or titles, using said database to identify the name of the person referred to by said relationship or title.

7. A method according to claim 1, wherein:
    the calendaring and scheduling application is integrated with said instant messaging application.

8. A method according to claim 7, wherein the processing data step includes the step of,
    when a specified command is given, said instant application processing data from the instant message session, looking for all information pertinent to starting to fill in the meeting invitation in the calendaring and scheduling application.

9. A method according to claim 8, wherein the step of further adding includes the step of going to a name resolution infrastructure of both the instant message application and the calendaring and scheduling application to resolve titles and relationships into names.

10. A system for scheduling a meeting, comprising:
    means for receiving a request from a participant in an instant message session to schedule a meeting, wherein an instant messaging application is used to run the instant message session;
    a natural language processing tool to determine meeting participants and available times, from a record of said instant message session;
    a calendaring and scheduling application including means for operating during the instant message session to accept said meeting participants and available times, consult calendars of said meeting participants, and schedule said meeting;
    means for sending a notification to the participants in said instant message session, and
    means for adding said meeting schedule to the calendars of said meeting participants,
    said instant messaging application processing data from the instant message session to fill in a meeting invitation in the calendaring and scheduling application, including
    initializing the meeting invitees to current participants in the instant message session,
    adding as additional invitees to the meeting any other participants in any part of the instant message session, and
    further adding as invitees to the meeting anyone else mentioned in the instant message session; and wherein
    the calendaring and scheduling application is used to map a range of dates and times mentioned positively and negatively in the instant message session to participant free time to propose automatically one or more times for the meeting, and to resolve phrases including a reference to a time and a negative word near said reference.

11. A system according to claim 10, wherein the natural language processing tool identifies at least some of the participants in the instant message session as meeting participants.

12. A system according to claim 11, wherein the natural language processing tool identifies all of the participants in the instant message session as meeting participants.

13. A system according to claim 10, wherein the natural language processing tool identifies as meeting participants at least some of the people mentioned in the message session.

14. A system according to claim 10, wherein in the instant message session, at least some people are referred to by relationships or titles, and the natural language processing tool identifies as meeting participants at least some of the people referred to in the instant message session by relationship or title.

15. A system according to claim 10, further comprising:
a database identifying names for a given set of relationships and titles; and wherein
the processing tool includes
   i) means for identifying at least some of said set of relationships and titles mentioned in the instant message session, and
   ii) means using said database to identify, for each of said mentioned relationships or titles, the name of the person referred to by said relationship or title.

16. A system according to claim 10, wherein:
the natural language processing tool includes means to determine, during the instant message session, meeting participants and available times, from a record of said instant message session; and
the means for sending the notification includes means for sending the notification to the participants in said instant message session, during said session, of the meeting schedule.

17. A program storage device readable by machine, tangibly embodying a program of instructions executable by the machine to perform method steps for scheduling a meeting, said method steps comprising:
receiving a request from a participant in an instant message session to schedule a meeting;
running a natural language processing tool during said session to determine meeting participants and available times, from a record of said instant message session;
running a calendaring and scheduling application during said session to accept said meeting participants and available times, consult calendars of said meeting participants, and schedule said meeting;
sending a notification to the participants in said instant message session, during said session, of the meeting schedule;
adding said meeting schedule to the calendars of said meeting participants;
said instant messaging application processing data from the instant message session to fill in a meeting invitation in the calendaring and scheduling application, including the steps of
initializing the meeting invitees to current participants in the instant message session,
adding as additional invitees to the meeting any other participants in any part of the instant message session, and
further adding as invitees to the meeting anyone else mentioned in the instant message session; and wherein
the step of running the calendaring and scheduling application includes the step of using the calendaring and scheduling application to map a range of dates and times mentioned positively and negatively in the instant message session to participant free time to propose automatically one or more times for the meeting, and to resolve phrases including a reference to a time and a negative word near said reference.

18. A program storage device according to claim 17, wherein the step of running the natural language processing tool includes the step of identifying at least some of the participants in the instant message session as meeting participants.

19. A program storage device according to claim 18, wherein the step of running the natural language processing tool includes the step of identifying all of the participants in the instant message session as meeting participants.

20. A program storage device according to claim 17, wherein in the instant message session at least some people are referred to by relationships or titles, and the step of running the natural language processing tool includes the step of identifying as meeting participants at least some of the people referred to in the instant message session by relationship or title.

* * * * *